(12) United States Patent
Morgan

(10) Patent No.: US 6,444,120 B1
(45) Date of Patent: Sep. 3, 2002

(54) ELECTRIC AQUARIUM CLEANING APPARATUS

(76) Inventor: Christopher O. Morgan, 479 Deborah Dr., Utica, NY (US) 13502

( * ) Notice: Subject to any disclaimer, the term of this patent is extended or adjusted under 35 U.S.C. 154(b) by 0 days.

(21) Appl. No.: 09/871,783

(22) Filed: Jun. 1, 2001

(51) Int. Cl.⁷ ............................................... A01K 63/04
(52) U.S. Cl. .................... 210/169; 210/416.2; 210/460; 119/259
(58) Field of Search ............................... 210/169, 416.2, 210/459, 460; 15/1.7, 246.5; 119/264, 259

(56) References Cited

U.S. PATENT DOCUMENTS

| | | | |
|---|---|---|---|
| 3,225,930 A | | 12/1965 | Willinger |
| 3,302,789 A | * | 2/1967 | Holt |
| 3,722,685 A | * | 3/1973 | Orensten et al. |
| 3,734,853 A | | 5/1973 | Horvath |
| 3,826,371 A | * | 7/1974 | Adamson |
| 4,094,788 A | | 6/1978 | Dockery |
| D282,016 S | | 12/1985 | Chestnut |
| 4,725,353 A | | 2/1988 | Whitman |
| 5,048,140 A | * | 9/1991 | Wu |
| 5,131,821 A | * | 7/1992 | Marioni et al. |
| 5,240,596 A | * | 8/1993 | Chestnut |
| 5,279,730 A | | 1/1994 | Chen |
| 5,318,701 A | * | 6/1994 | Wang |

* cited by examiner

Primary Examiner—David A. Simmons
Assistant Examiner—Fred Prince

(57) ABSTRACT

An electric aquarium cleaning apparatus for removing dirty water and debris from a fish tank and replenishing it with fresh water. The electric aquarium cleaning apparatus includes an intake section coupled to an electric pump assembly, and an outlet tube for expelling the dirty water. The pump is reversible allowing refilling of the tank with fresh water.

19 Claims, 4 Drawing Sheets

ELECTRIC AQUARIUM CLEANING APPARATUS

BACKGROUND OF THE INVENTION

1. Field of the Invention

The present invention relates to aquarium cleaners and more particularly pertains to a new electric aquarium cleaning apparatus for removing dirty water and debris from a fish tank and replenishing it with fresh water.

2. Description of the Prior Art

The use of aquarium cleaners is known in the prior art. More specifically, aquarium cleaners heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,725,353; 5,279,730; 4,094,788; 3,734,853; 3,225,930; and U.S. Pat. No. Des. 282,016.

While these devices fulfill their respective, particular objectives and requirements, the aforementioned patents do not disclose a new electric aquarium cleaning apparatus. The inventive device includes an intake section coupled to an electric pump assembly, and an outlet tube for expelling the dirty water. The pump is reversible allowing refilling of the tank with fresh water.

In these respects, the electric aquarium cleaning apparatus according to the present invention substantially departs from the conventional concepts and designs of the prior art, and in so doing provides an apparatus primarily developed for the purpose of removing dirty water and debris from a fish tank and replenishing it with fresh water.

SUMMARY OF THE INVENTION

In view of the foregoing disadvantages inherent in the known types of aquarium cleaners now present in the prior art, the present invention provides a new electric aquarium cleaning apparatus construction wherein the same can be utilized for removing dirty water and debris from a fish tank and replenishing it with fresh water.

The general purpose of the present invention, which will be described subsequently in greater detail, is to provide a new electric aquarium cleaning apparatus apparatus and method which has many of the advantages of the aquarium cleaners mentioned heretofore and many novel features that result in a new electric aquarium cleaning apparatus which is not anticipated, rendered obvious, suggested, or even implied by any of the prior art aquarium cleaners, either alone or in any combination thereof.

To attain this, the present invention generally comprises an intake section coupled to an electric pump assembly, and an outlet tube for expelling the dirty water. The pump is reversible allowing refilling of the tank with fresh water.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electric aquarium cleaning apparatus apparatus and method which has many of the advantages of the aquarium cleaners mentioned heretofore and many novel features that result in a new electric aquarium cleaning apparatus which is not anticipated, rendered obvious, suggested, or even implied by any of the prior art aquarium cleaners, either alone or in any combination thereof.

It is another object of the present invention to provide a new electric aquarium cleaning apparatus which may be easily and efficiently manufactured and marketed.

It is a further object of the present invention to provide a new electric aquarium cleaning apparatus which is of a durable and reliable construction.

An even further object of the present invention is to provide a new electric aquarium cleaning apparatus which is susceptible of a low cost of manufacture with regard to both materials and labor, and which accordingly is then susceptible of low prices of sale to the consuming public, thereby making such electric aquarium cleaning apparatus economically available to the buying public.

Still yet another object of the present invention is to provide a new electric aquarium cleaning apparatus which provides in the apparatuses and methods of the prior art some of the advantages thereof, while simultaneously overcoming some of the disadvantages normally associated therewith.

Still another object of the present invention is to provide a new electric aquarium cleaning apparatus for removing dirty water and debris from a fish tank and replenishing it with fresh water.

Yet another object of the present invention is to provide a new electric aquarium cleaning apparatus which includes an intake section coupled to an electric pump assembly, and an outlet tube for expelling the dirty water. The pump is reversible allowing refilling. of the tank with fresh water.

Still yet another object of the present invention is to provide a new electric aquarium cleaning apparatus that utilizes and electric pump making the process nearly effortless.

Even still another object of the present invention is to provide a new electric aquarium cleaning apparatus that has a submersible pump that can, if desired, be placed directly inside larger tanks, or simply set beside smaller tanks.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
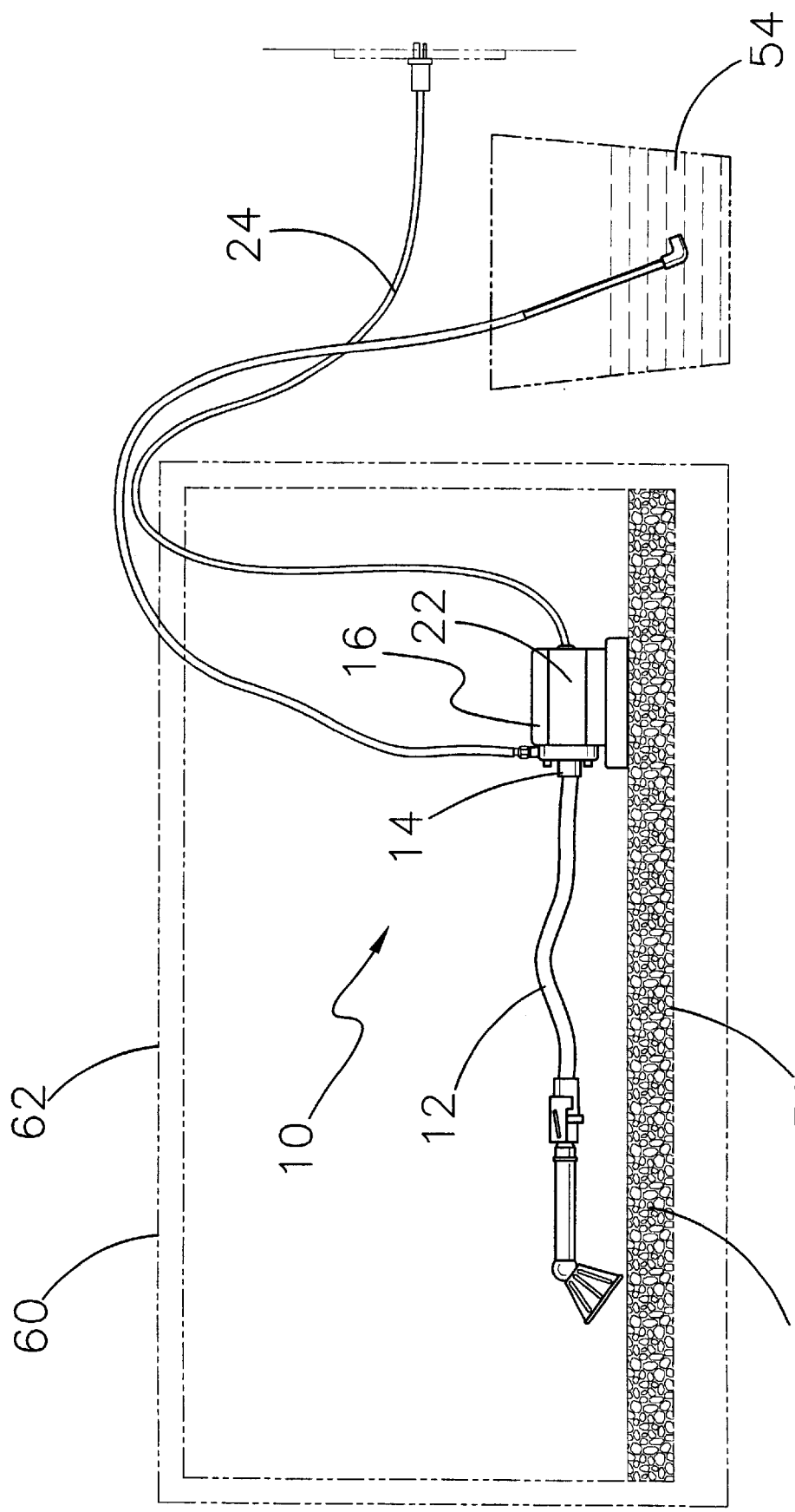
FIG. 1 is a side view of a new electric aquarium cleaning apparatus submerged in a large tank according to the present invention.
Figure 2:
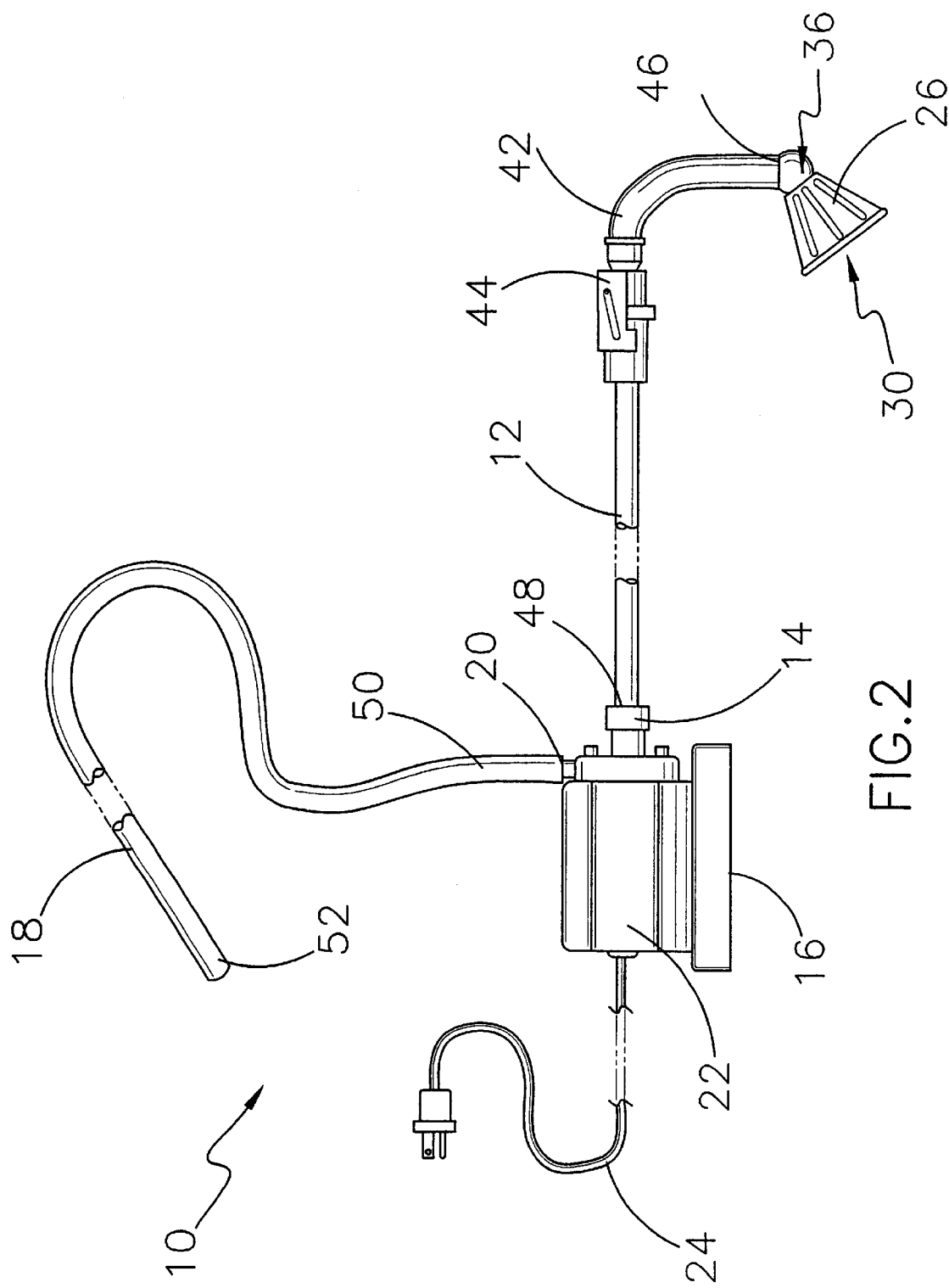
FIG. 2 is a side view of the present invention.
Figure 3:
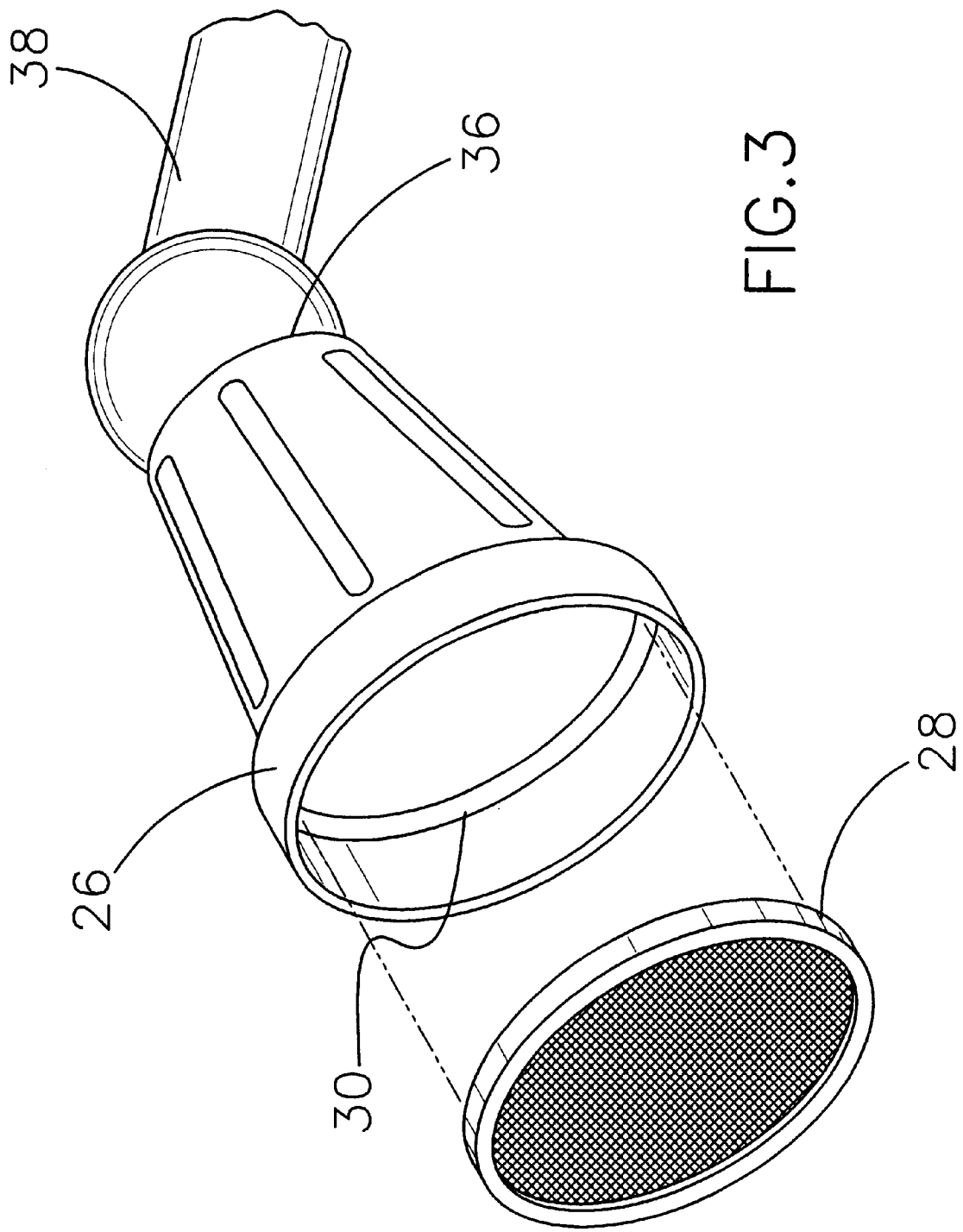
FIG. 3 is a partial perspective view of the intake portion of the present invention.
Figure 4:
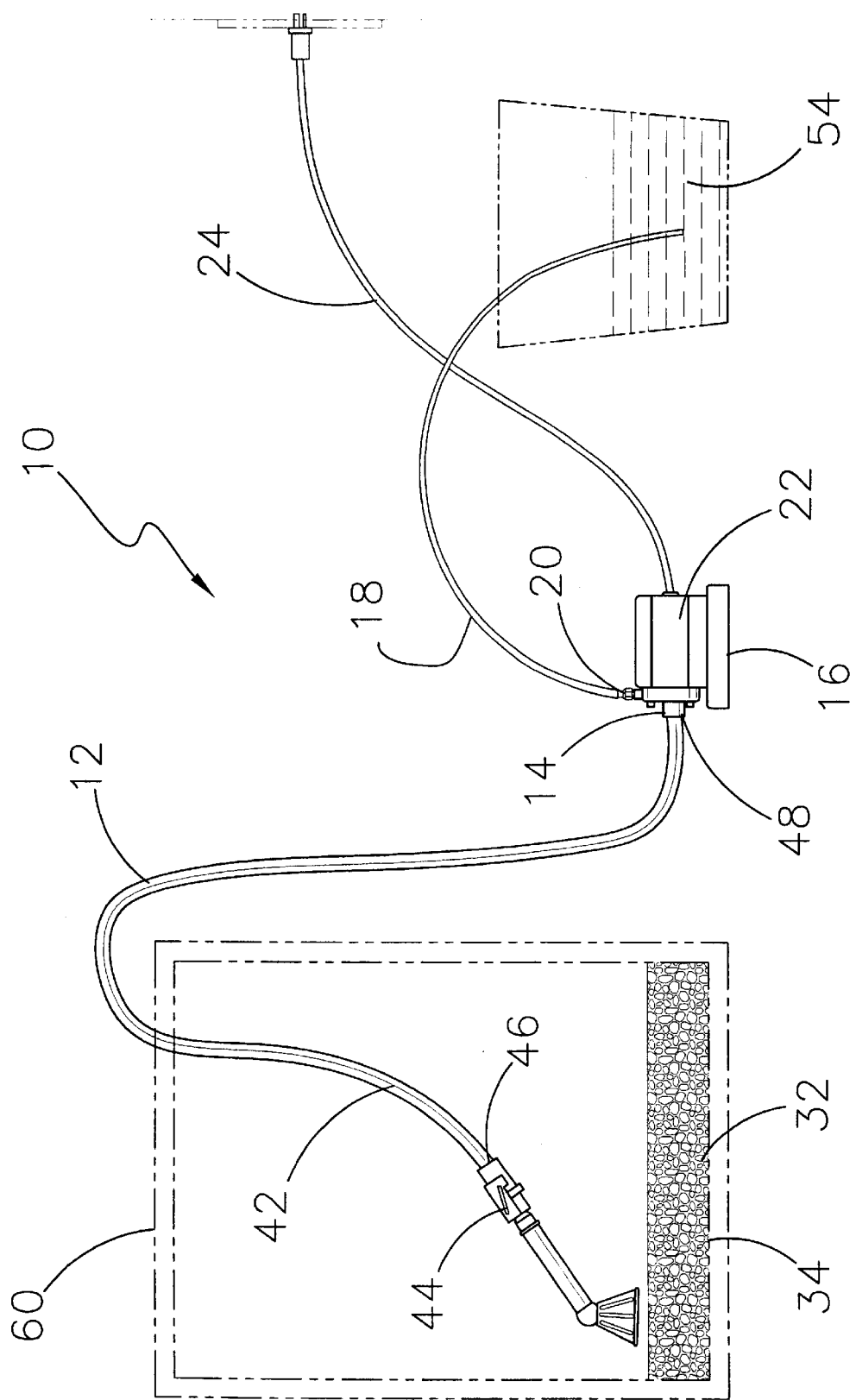
FIG. 4 is a side view of the present invention being used on a small tank.

With reference now to the drawings, and in particular to FIGS. 1 through 4 thereof, a new electric aquarium cleaning apparatus embodying the principles and concepts of the present invention and generally designated by the reference numeral 10 will be described.

As best illustrated in FIGS. 1 through 4, the electric aquarium cleaning apparatus 10 generally comprises an intake section 12 coupled to an inlet port 14 of a pump assembly 16. An outlet tube 18 is connected to an outlet port 20 of the pump assembly 16 for removing dirty water from a fish tank 60 for the purpose of cleaning the tank 60.

The pump assembly 16 includes an electric motor 22. The electric motor is electrically coupled to an electrical cord 24 for supplying power to the electric motor 22.

The pump assembly 16 is fully submersible such that the pump assembly 16 may be placed inside of the tank 60 to facilitate the cleaning of large tanks 62.

The intake section 12 has a cleaning head 26. The cleaning head 26 includes a gravel 32 screen 28 coupled to an inlet side 30 of the cleaning head 26 for preventing any gravel 32 from a bottom of the tank 34 from entering the cleaning head 26.

An outlet side 36 of the cleaning head 26 is pivotally coupled to an intake tube portion 38 for allowing flexibility during cleaning of the tank 60.

The intake section 12 comprises an intake tube portion 38. The intake tube portion 38 is for fluidly connecting a cleaning head 26 to the pump assembly 16.

The intake tube portion 38 consists of a flexible tube member 42. The flexible tube member 42 includes a flow valve 44 for manually regulating the flow of water into the intake portion. A first end 46 of the flexible tube member 42 is pivotally coupled to an outlet side 36 of the cleaning head 26. A second end 48 of the flexible tube member 42 is coupled to the inlet port 14 of the pump assembly 16 for receiving dirty water into the pump assembly 16.

The outlet tube 18 includes a connecting end 50. The connecting end 50 is coupled to the outlet port 20 of the pump assembly 16 for fluidly transferring the dirty water collected by the pump assembly 16 through the outlet tube 18. The outlet tube 18 includes an exit end 52 opposite the connecting end 50 for expelling the dirty water into a drain or reservoir 54.

The pump assembly 16 is reversible, thereby facilitating the filling of the tank 60 with clean water after the tank 60 has been cleansed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electric aquarium cleaning apparatus for cleaning a fish tank, the electric aquarium cleaning apparatus comprising:

an intake section, said intake section being coupled to an inlet port of a pump assembly, an outlet tube connected to an outlet port of said pump assembly for removing dirty water from a fish tank for the purpose of cleaning the tank; and said pump assembly being reversible for facilitating filling of the tank with clean water after the tank has been cleansed.

2. The electric aquarium cleaning apparatus as set forth in claim 1, further comprising:

said pump assembly including an electric motor, said electric motor being electrically coupled to an electrical cord for supplying power to the said electric motor; and said pump assembly being fully submersible such that said pump assembly may be placed inside of the tank to facilitate the cleaning of large tanks.

3. The electric aquarium cleaning apparatus as set forth in claim 1, further comprising:

said intake section comprising a cleaning head, said cleaning head having a gravel screen coupled to an inlet side of said cleaning head for preventing any gravel from a bottom of the tank from entering said cleaning head.

4. The electric aquarium cleaning apparatus as set forth in claim 3, further comprising:

an outlet side of said cleaning head being pivotally coupled to an intake tube portion for allowing flexibility during cleaning of the tank.

5. The electric aquarium cleaning apparatus as set forth in claim 1, further comprising:
    said intake section comprising an intake tube portion, said intake tube portion being for fluidly connecting a cleaning head to said pump assembly.

6. The electric aquarium cleaning apparatus as set forth in claims 5, further comprising:
    said intake tube portion comprising a flexible tube member, said flexible tube member including a flow valve for manually regulating the flow of water into said intake portion, a first end of said flexible tube member being pivotally coupled to an outlet side of said cleaning head, a second end of said flexible tube member being coupled to said inlet port of said pump assembly for receiving dirty water into said pump assembly.

7. An electric aquarium cleaning apparatus comprising:
    an intake section, said intake section being coupled to an inlet port of a pump assembly, an outlet tube connected to an outlet port of said pump assembly for removing dirty water from a fish tank for the purpose of cleaning the tank;
    said intake section comprising a cleaning head, said cleaning head having a gravel screen-coupled to an inlet side of said cleaning head for preventing any gravel from a bottom of the tank from entering said cleaning head; and
    an outlet side of said cleaning head being pivotally coupled to an intake tube portion for allowing flexibility during cleaning of the tank.

8. The electric aquarium cleaning apparatus as set forth in claim 7, further comprising:
    said pump assembly including an electric motor, said electric motor being electrically coupled to an electrical cord for supplying power to the said electric motor; and
    said pump assembly being fully submersible such that said pump assembly may be placed inside of the tank to facilitate the cleaning of large tanks.

9. The electric aquarium cleaning apparatus as set forth in claim 7, further comprising:
    said intake section comprising an intake tube portion, said intake tube portion being for fluidly connecting a cleaning head to said pump assembly.

10. The electric aquarium cleaning apparatus as set forth in claim 9, further comprising:
    said intake tube portion comprising a flexible tube member, said flexible tube member including a flow valve for manually regulating the flow of water into said intake portion, a first end of said flexible tube member being pivotally coupled to an outlet side of said cleaning head, a second end of said flexible tube member being coupled to said inlet port of said pump assembly for receiving dirty water into said pump assembly.

11. The electric aquarium cleaning apparatus as set forth in claim 7, further comprising:
    said outlet tube including a connecting end, said connecting end being coupled to said outlet port of said pump assembly for fluidly transferring dirty water collected by said pump assembly through said outlet tube, said outlet tube having an exit end opposite said connecting end for expelling the dirty water.

12. The electric aquarium cleaning apparatus as set forth in claim 7, further comprising:
    said pump assembly being reversible for facilitating filling of the tank with clean water after the tank has been cleansed.

13. An electric aquarium cleaning apparatus comprising:
    an intake section, said intake section being coupled to an inlet port of a pump assembly, an outlet tube connected to an outlet port of said pump assembly for removing dirty water from a fish tank for the purpose of cleaning the tank;
    said intake section comprising an intake tube portion, said intake tube portion being for fluidly connecting a cleaning head to said pump assembly; and
    said intake tube portion comprising a flexible tube member, said flexible tube member including a flow valve for manually regulating the flow of water into said intake portion, a first end of said flexible tube member being pivotally coupled to an outlet side of said cleaning head, a second end of said flexible tube member being coupled to said inlet port of said pump assembly for receiving dirty water into said pump assembly.

14. The electric aquarium cleaning apparatus as set forth in claim 1, further comprising:
    said outlet tube including a connecting end, said connecting end being coupled to said outlet port of said pump assembly for fluidly transferring dirty water collected by said pump assembly through said outlet tube, said outlet tube having an exit end opposite said connecting end for expelling the dirty water.

15. The electric aquarium cleaning apparatus as set forth in claim 13, further comprising:
    said pump assembly including an electric motor, said electric motor being electrically, coupled to an electrical cord for supplying power to the said electric motor; and
    said pump assembly being fully submersible such that said pump assembly may be placed inside of the tank to facilitate the cleaning of large tanks.

16. The electric aquarium cleaning apparatus as set forth in claim 13, further comprising:
    said intake tube portion comprising a flexible tube member, said flexible tube member including a flow valve for manually regulating the flow of water into said intake portion, a first end of said flexible tube member being pivotally coupled to an outlet side of said cleaning head, a second end of said flexible tube member being coupled to said inlet port of said pump assembly for receiving dirty water into said pump assembly.

17. The electric aquarium cleaning apparatus as set forth in claim 16 further comprising:
    an outlet side of said cleaninghead being pivotally coupled to an intake tube portion for allowing flexibility during cleaning of the tank.

18. The electric aquarium cleaning apparatus as set forth in claim 13, further comprising:
    said outlet tube including a connecting end, said connecting end being coupled to said outlet port of said pump assembly for fluidly transferring dirty water collected by said pump assembly through said outlet tube, said outlet tube having an exit end opposite said connecting end for expelling the dirty water.

19. The electric aquarium cleaning apparatus as set forth in claim 13, further comprising:
    said pump assembly being reversible for facilitating filling of the tank with clean water after the tank has been cleansed.

* * * * *

(12) EX PARTE REEXAMINATION CERTIFICATE (6150th)
United States Patent
Morgan

(10) Number: US 6,444,120 C1
(45) Certificate Issued: Mar. 11, 2008

(54) ELECTRIC AQUARIUM CLEANING APPARATUS

(76) Inventor: Christopher O. Morgan, 479 Deborah Dr., Utica, NY (US) 13502

Reexamination Request:
No. 90/007,794, Nov. 3, 2005

Reexamination Certificate for:
Patent No.: 6,444,120
Issued: Sep. 3, 2002
Appl. No.: 09/871,783
Filed: Jun. 1, 2001

(51) Int. Cl.
*A01K 63/04* (2006.01)
*A01K 61/00* (2006.01)

(52) U.S. Cl. ............... 210/167.23; 119/259; 210/416.2; 210/460

(58) Field of Classification Search ............ None
See application file for complete search history.

(56) References Cited

U.S. PATENT DOCUMENTS

| 4,610,784 A | * | 9/1986 | Reyniers ............ 210/169 |
| 5,131,821 A | * | 7/1992 | Marioni et al. ....... 417/423.3 |
| 5,695,654 A | * | 12/1997 | Schultz ............. 210/780 |
| 6,568,425 B2 | * | 5/2003 | Gergek ............ 137/565.16 |

* cited by examiner

*Primary Examiner*—Alan Diamond

(57) ABSTRACT

An electric aquarium cleaning apparatus for removing dirty water and debris from a fish tank and replenishing it with fresh water. The electric aquarium cleaning apparatus includes an intake section coupled to an electric pump assembly, and an outlet tube for expelling the dirty water. The pump is reversible allowing refilling of the tank with fresh water.

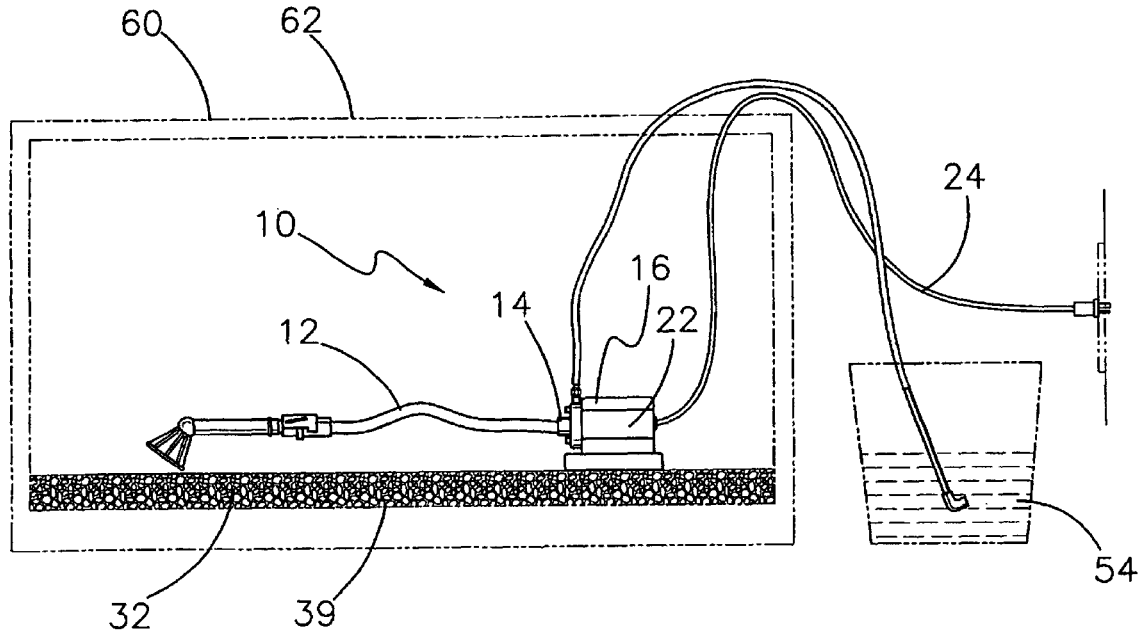

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–19 are cancelled.

* * * * *